(12) United States Patent
Dabak et al.

(10) Patent No.: US 6,804,311 B1
(45) Date of Patent: Oct. 12, 2004

(54) DIVERSITY DETECTION FOR WCDMA

(75) Inventors: Anand G. Dabak, Plano, TX (US); Srinath Hosur, Plano, TX (US); Shigenori Kinjo, Ibaraki (JP); Alan Gatherer, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/526,019

(22) Filed: Mar. 15, 2000

Related U.S. Application Data (60) Provisional application No. 60/128,338, filed on Apr. 8, 1999, and provisional application No. 60/128,837, filed on Apr. 9, 1999.

(51) Int. Cl.[7] .............................................. H04L 27/20
(52) U.S. Cl. ...................................... 375/347; 375/267
(58) Field of Search ................................ 375/299, 347; 455/101, 103, 132

(56) References Cited

U.S. PATENT DOCUMENTS 5,787,122 A * 7/1998 Suzuki ........................ 375/267
6,366,568 B1 * 4/2002 Bolgiano et al. ........... 370/320

OTHER PUBLICATIONS

"A Simple Transmit Diversity Technique for Wireless Communications", Siavash M. Alamouti, IEEE Journal on Select Areas in Communications, vol. 16, No. 8, 10/98, pp. 1451–1458.
"New Detection Schemes for Transmit Diversity with No Channel Estimation", Vahid Tarokh, et al., IEEE, 1998, pp. 917–920.

* cited by examiner

*Primary Examiner*—Stephen Chin
*Assistant Examiner*—Kevin Kim
(74) *Attorney, Agent, or Firm*—Ronald O. Neerings; Wade James Brady, III; Frederick J. Telecky, Jr.

(57) ABSTRACT

A circuit for detecting a transmit diversity signal comprises a first circuit (706) arranged to receive a first synchronization code. The first synchronization code is modulated by a data signal. The first circuit produces a first output signal. A second circuit (732) is arranged to receive a plurality of predetermined signals. The second circuit produces a channel estimate. A detection circuit (710, 712) is arranged to receive the first output signal and the channel estimate. The detection circuit produces a signal corresponding to the data signal.

55 Claims, 5 Drawing Sheets

DIVERSITY DETECTION FOR WCDMA

CLAIM TO PRIORITY OF PROVISIONAL APPLICATION

This application claims priority under 35 U.S.C. § 119(e)(1) of provisional application ser. No. 60/128,338, filed Apr. 8, 1999 and provisional application ser. No. 60/128,837, filed Apr.9, 1999.

FIELD OF THE INVENTION

This invention relates to wideband code division multiple access (WCDMA) for a communication system and more particularly to modulation of primary or secondary synchronization codes to indicate space-time transmit diversity for WCDMA signals.

BACKGROUND OF THE INVENTION

Present code division multiple access (CDMA) systems are characterized by simultaneous transmission of different data signals over a common channel by assigning each signal a unique code. This unique code is matched with a code of a selected receiver to determine the proper recipient of a data signal. These different data signals arrive at the receiver via multiple paths due to ground clutter and unpredictable signal reflection. Additive effects of these multiple data signals at the receiver may result in significant fading or variation in received signal strength. In general, this fading due to multiple data paths may be diminished by spreading the transmitted energy over a wide bandwidth. This wide bandwidth results in greatly reduced fading compared to narrow band transmission modes such as frequency division multiple access (FDMA) or time division multiple access (TDMA).

New standards are continually emerging for next generation wideband code division multiple access (WCDMA) communication systems as described in Provisional U.S. patent application Ser. No. 60/082,671,filed Apr. 22, 1998, and incorporated herein by reference. These WCDMA systems are coherent communications systems with pilot symbol assisted channel estimation schemes. These pilot symbols are transmitted as quadrature phase shift keyed (QPSK) known data in predetermined time frames to any receivers within range. The frames may propagate in a discontinuous transmission (DTX) mode. For voice traffic, transmission of user data occurs when the user speaks, but no data symbol transmission occurs when the user is silent. Similarly for packet data, the user data may be transmitted only when packets are ready to be sent. The frames are subdivided into fifteen equal time slots of 0.67 milliseconds each. Each time slot is further subdivided into equal symbol times. At a data rate of 30 KSPS, for example, each time slot includes twenty symbol times. Each frame includes pilot symbols as well as other control symbols such as transmit power control (TPC) symbols and rate information (RI) symbols. These control symbols include multiple bits otherwise known as chips to distinguish them from data bits. The chip transmission time ($T_C$), therefore, is equal to the symbol time rate (T) divided by the number of chips in the symbol (N).

Previous studies have shown that multiple transmit antennas may improve reception by increasing transmit diversity for narrow band communication systems. In their paper *New Detection Schemes for Transmit Diversity with no Channel Estimation*, Tarokh et al. describe such a transmit diversity scheme for a TDMA system. The same concept is described in *A Simile Transmitter Diversity Technique for Wireless Communications* by Alamouti. Tarokh et al. and Alamouti, however, fail to teach such a transmit diversity scheme for a WCDMA communication system.

Figure 1:
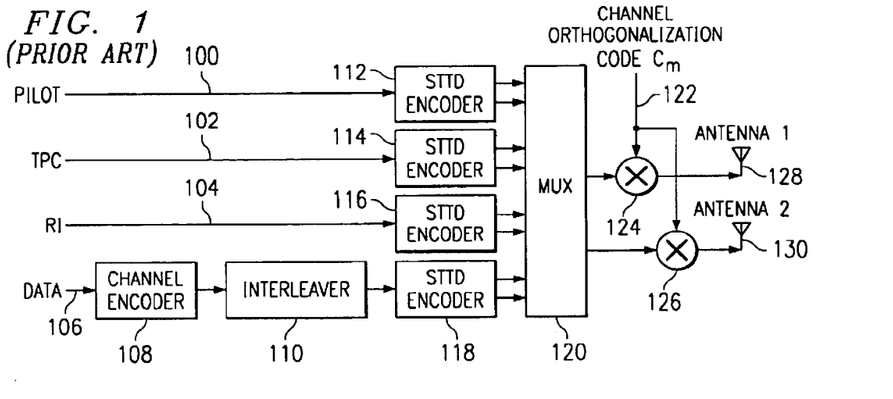
FIG. 1 is a simplified block diagram of a typical transmitter using Space-Time Transit Diversity (STTD) of the prior art.

Referring to FIG. 1, there is a simplified block diagram of a typical transmitter using Space-Time Transit Diversity (STTD) of the prior art. The transmitter circuit receives pilot symbols, TPC symbols, RI symbols and data symbols on leads 100, 102, 104 and 106, respectively. Each of the symbols is encoded by a respective STTD encoder. Each STTD encoder produces two output signals that are applied to multiplex circuit 120. The multiplex circuit 120 produces each encoded symbol in a respective symbol time of a frame. Thus, a serial sequence of symbols in each frame is simultaneously applied to each respective multiplier circuit 124 and 126. A channel orthogonal code $C_m$ is multiplied by each symbol to provide a unique signal for a designated receiver. The STTD encoded frames are then applied to antennas 128 and 130 for transmission.

Figure 2:
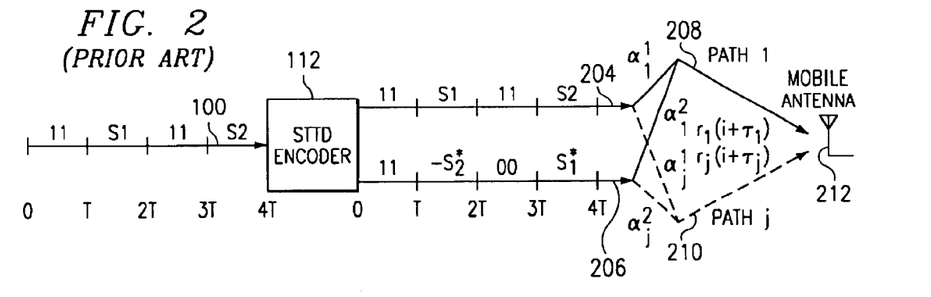
FIG. 2 is a block diagram showing signal flow in an STTD encoder of the prior art that may be used with the transmitter of FIG. 1.

Turning now to FIG. 2, there is a block diagram showing signal flow in an STTD encoder of the prior art that may be used with the transmitter of FIG. 1 for pilot symbol encoding. The pilot symbols are predetermined control signals that may be used for channel estimation and other functions. The encoding pattern of STTD encoder 112 is given in TABLE I. The STTD encoder receives pilot symbol 11 at symbol time T, pilot symbol $S_1$ at symbol time 2T, pilot symbol 11 at symbol time 3T and pilot symbol $S_2$ at symbol time 4T on lead 100 for each of sixteen time slots of a frame. The encoder has an exemplary data rate of 32 KSPS and produces a sequence of four pilot symbols for each of two antennas corresponding to leads 204 and 206, respectively, for each of the sixteen time slots of TABLE I. The STTD encoder produces pilot symbols $B_1, S_1, B_2$ and $S_2$ at symbol times T-4T, respectively, for a first antenna at lead 204. The STTD encoder simultaneously produces pilot symbols $B_1$, $-S_2^*$, $-B_2$ and $S_1^*$ at symbol times T-4T, respectively, at lead 206 for a second antenna. Each symbol includes two bits representing a real and imaginary component. An asterisk indicates a complex conjugate operation or sign change of the imaginary part of the symbol. Pilot symbol values for the first time slot for the first antenna at lead 204, therefore, are 11, 11, 11 and 11. Corresponding pilot symbols for the second antenna at lead 206 are 11, 01, 00 and 10.

The bit signals $r_j(i+\pi_j)$ of these symbols are transmitted serially along respective paths 208 and 210. Each bit signal of a respective symbol is subsequently received at a remote mobile antenna 212 after a transmit time $\pi$ corresponding to the $j^{th}$ path. The signals propagate to a despreader input circuit (not shown) where they are summed over each respective symbol time to produce input signals $R_j^1, R_j^2, R_j^3$ and $R_j^4$ corresponding to the four pilot symbol time slots and the $j^{th}$ of L multiple signal paths as previously described.

TABLE I

| | ANTENNA 1 | | | | ANTENNA 2 | | | |
|---|---|---|---|---|---|---|---|---|
| SLOT | $B_1$ | $S_1$ | $B_2$ | $S_2$ | $B_1$ | $-S_2^*$ | $-B_2$ | $S_1^*$ |
| 1 | 11 | 11 | 11 | 11 | 11 | 01 | 00 | 10 |
| 2 | 11 | 11 | 11 | 01 | 11 | 11 | 00 | 10 |
| 3 | 11 | 01 | 11 | 01 | 11 | 11 | 00 | 00 |
| 4 | 11 | 10 | 11 | 01 | 11 | 11 | 00 | 11 |
| 5 | 11 | 10 | 11 | 11 | 11 | 01 | 00 | 11 |
| 6 | 11 | 10 | 11 | 11 | 11 | 01 | 00 | 11 |
| 7 | 11 | 01 | 11 | 00 | 11 | 10 | 00 | 00 |
| 8 | 11 | 10 | 11 | 01 | 11 | 11 | 00 | 11 |

TABLE I-continued

| | ANTENNA 1 | | | | ANTENNA 2 | | | |
|---|---|---|---|---|---|---|---|---|
| SLOT | $B_1$ | $S_1$ | $B_2$ | $S_2$ | $B_1$ | $-S_2{}^*$ | $-B_2$ | $S_1{}^*$ |
| 9 | 11 | 11 | 11 | 00 | 11 | 10 | 00 | 10 |
| 10 | 11 | 01 | 11 | 01 | 11 | 11 | 00 | 00 |
| 11 | 11 | 11 | 11 | 10 | 11 | 00 | 00 | 10 |
| 12 | 11 | 01 | 11 | 01 | 11 | 11 | 00 | 00 |
| 13 | 11 | 00 | 11 | 01 | 11 | 11 | 00 | 01 |
| 14 | 11 | 10 | 11 | 00 | 11 | 10 | 00 | 11 |
| 15 | 11 | 01 | 11 | 00 | 11 | 10 | 00 | 00 |
| 16 | 11 | 00 | 11 | 00 | 11 | 10 | 00 | 01 |

The input singals corresponding to the pilot symbols for each time slot are given in equations [5–8]. Noise terms are omitted for simplicity. Received signal $R_j{}^1$ is produced by pilot symbols $(B_1,B_1)$ having a constant value (11,11) at symbol time T for all time slots. Thus, the received signal is equal to the sum of respective Rayleigh fading parameters corresponding to the first and second antennas. Likewise, received signal $R_j{}^3$ is produced by pilot symbols $(B_2,-B_2)$ having a constant value (11,00) at symbol time 3T for all time slots. Channel estimates for the Rayleigh fading parameters corresponding to the first and second antennas, therefore, are readily obtained from input signals $R_j{}^1$ and $R_j{}^3$ as in equations [9] and [10].

$$R_j{}^1 = \alpha_j{}^1 + \alpha_j{}^2 \qquad [5]$$

$$R_j{}^2 = \alpha_j{}^1 S_1 - \alpha_j{}^2 S_2{}^* \qquad [6]$$

$$R_j{}^3 = \alpha_j{}^1 - \alpha_j{}^2 \qquad [7]$$

$$R_j{}^4 = \alpha_j{}^1 S_1 + \alpha_j{}^2 S_1{}^* \qquad [8]$$

$$\alpha_j{}^1 = (R_j{}^1 + R_j{}^3)/2 \qquad [9]$$

$$\alpha_j{}^2 = (R_j{}^1 - R_j{}^3)/2 \qquad [10]$$

Figure 3:
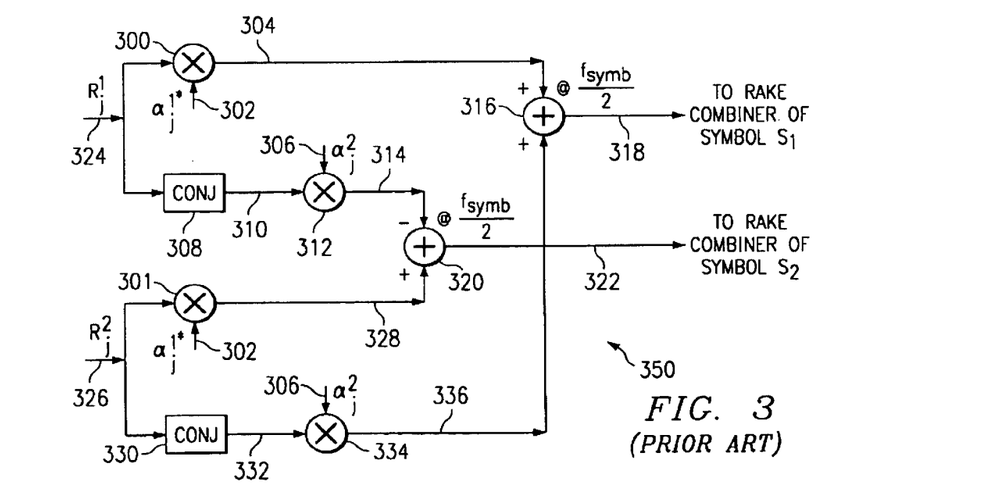
FIG. 3 is a schematic diagram of a phase correction circuit of the prior art that may be used with a receiver.

Referring now to FIG. 3, there is a schematic diagram of a phase correction circuit of the prior art that may be used with a remote mobile receiver. This phase correction circuit receives input signals $R_j{}^1$ and $R_j{}^2$ on leads 324 and 326 at symbol times 2T and 4T, respectively. Each input signal has a value determined by the transmitted pilot symbols as shown in equations [6] and [8], respectively. The phase correction circuit receives a complex conjugate of a channel estimate of a Rayleigh fading parameter $\alpha_j{}^{1*}$ corresponding to the first antenna on lead 302 and a channel estimate of another Rayleigh fading parameter $\alpha_j{}^2$ corresponding to the second antenna on lead 306. Complex conjugates of the input signals are produced by circuits 308 and 330 at leads 310 and 322, respectively. These input signals and their complex conjugates are multiplied by Rayleigh fading parameter estimate signals and summed as indicated to produce path-specific first and second symbol estimates at respective output leads 318 and 322 as in equations [11] and [12].

$$R_j{}^1 \alpha_j{}^{1*} + R_j{}^{2*} \alpha_j{}^2 = (|\alpha_j{}^1|^2 + |\alpha_j{}^2|^2) S_1 \qquad [11]$$

$$-R_j{}^{1*} \alpha_j{}^2 + R_j{}^2 \alpha_j{}^{1*} = (|\alpha_j{}^1|^2 + |\alpha_j{}^2|^2) S_2 \qquad [12]$$

Figure 4:
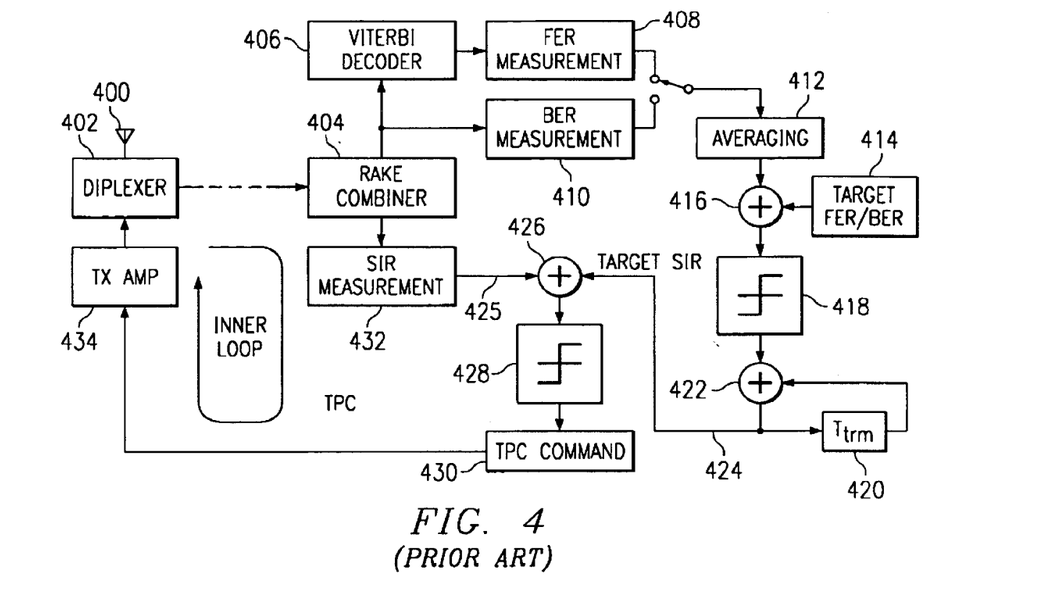
FIG. 4 is a block diagram of a receiver that with the phase correction circuit of FIG. 3.

These path-specific symbol estimates are then applied to a rake combiner circuit 404 (FIG. 4) to sum individual path-specific symbol estimates, thereby providing net soft symbols or pilot symbol signals as in equations [13] and [14].

$$\tilde{S}_1 = \sum_{j=1}^{L} R_j{}^1 \alpha_j{}^{1*} + R_j{}^{2*} \alpha_j{}^2 \qquad [13]$$

$$\tilde{S}_2 = \sum_{j=1}^{L} -R_j{}^{1*} \alpha_j{}^2 + R_j{}^2 \alpha_j{}^{1*} \qquad [14]$$

These soft symbols or estimates provide a path diversity L and a transmit diversity 2. Thus, the total diversity of the STTD system is 2L. This increased diversity is highly advantageous in providing a reduced bit error rate.

Referring now to FIG. 4, there is a simplified diagram of a mobile communication system that may use the phase correction circuit (FIG. 3). The mobile communication system includes an antenna 400 for transmitting and receiving external signals. The diplexer 402 controls the transmit and receive function of the antenna. Multiple fingers of rake combiner circuit 404 combine received signals from multiple paths. Symbols from the rake combiner circuit 404, including pilot symbol signals of equations [13] and [14], are applied to a bit error rate (BER) circuit 410 and to a Viterbi decoder 406. Decoded symbols from the Viterbi decoder are applied to a frame error rate (FER) circuit 408. Averaging circuit 412 produces one of a FER and BER. This selected error rate is compared to a corresponding target error rate from reference circuit 414 by comparator circuit 416. The compared result is applied to bias circuit 420 via circuit 418 for generating a signal-to-interference ratio (SIR) reference signal on lead 424.

Pilot symbols from the rake combiner 404 are applied to the SIR measurement circuit 432. These pilot symbols are obtained from a common pilot channel similar to a broadcast channel. The SIR measurement circuit produces a received signal strength indicator (RSSI) estimate from an average of received pilot symbols. The SIR measurement circuit also produces an interference signal strength indicator (ISSI) estimate from an average of interference signals from base stations and other mobile systems over many time slots. The SIR measurement circuit produces an SIR estimate from a ratio of the RSSI signal to the ISSI signal. This SIR estimate is compared with a target SIR by circuit 426. This comparison result is applied to TPC command circuit 430 via circuit 428. The TPC command circuit 430 sets a TPC symbol control signal that is transmitted to a remote base station. This TPC symbol instructs the base station to either increase or decrease transmit power by preferably 1 dB for subsequent transmission.

Figure 5:
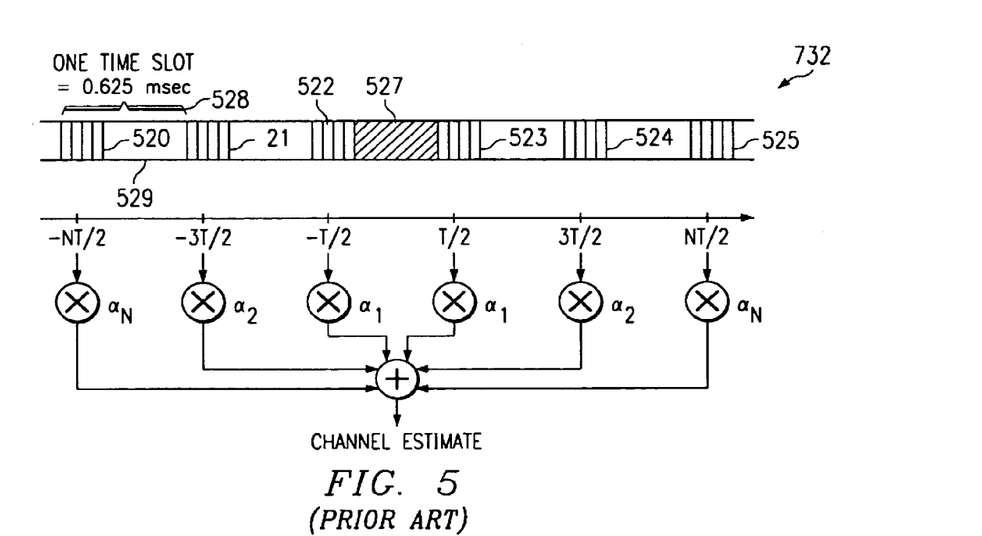
FIG. 5 is a block diagram showing weighted multi-slot averaging (WMSA) of the prior art.

Turning now to FIG. 5, there is a diagram showing a weighted multi-slot averaging (WMSA) circuit 732 of the prior art for channel estimation. In operation, a signal buffer circuit 706 FIG. 7) receives individual frames of data having a predetermined time period of 10 milliseconds. Each frame of the PCCPCH is subdivided into sixteen equal time slots of 0.625 milliseconds each. Each time slot, for example time slot 528, includes a respective set of pilot symbols 520 and data symbols 529. The WMSA circuit (FIG. 5) samples pilot symbols from preferably 6 time slots for a Doppler frequency of less than 80 Hz and from preferably 4 time slots for a Doppler frequency of 80 Hz or more. These sampled pilot symbols are multiplied by respective weighting coefficients $\alpha_1$ through $\alpha_N$ and combined by the adder circuit "+" to produce a channel estimate. This channel estimate is used to correct the phase of received data symbols in time slot 527 estimate for a respective transmit antenna.

Figure 6:
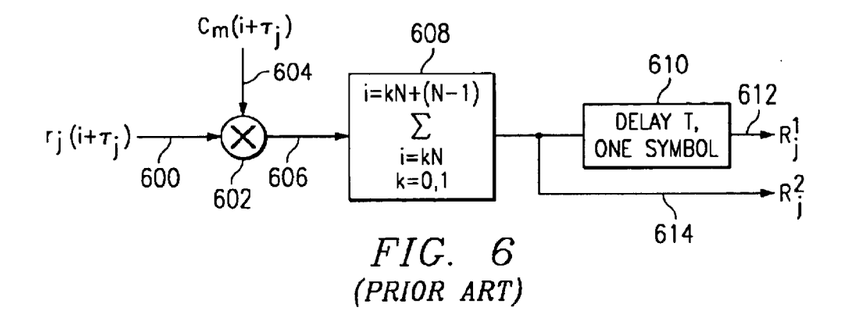
FIG. 6 is a schematic diagram of a despreader circuit of the prior art.

Referring now to FIG. 6, there is a despreader circuit of the prior art. Received signals from mobile antenna 212 propagate to the despreader circuit where they are summed over each respective symbol time to produce output signals $R_j^1$ and $R_j^2$ corresponding to the $j^{th}$ of L multiple signal paths as previously described. The despreader circuit receives the $i^{th}$ of N chip signals per symbol together with noise along the $j^{th}$ of L multiple signal paths at a time $\pi_j$ after transmission. Both here and in the following text, noise terms are omitted for simplicity. This received signal $r_j(i+\pi_j)$ at lead 600 is multiplied by a channel orthogonal code signal $C_m(i+\pi_j)$ at lead 604 that is unique to the receiver. Each chip signal is summed over a respective symbol time by circuit 608 and produced as first and second output signals $R_j^1$ and $R_j^2$ on leads 612 and 614 as in equations [1–2], respectively. Delay circuit 610 provides a one-symbol delay T so that the output signals are produced simultaneously.

This arrangement advantageously provides additional gain at the mobile communication system by multiple path transmit antenna diversity from a remote base station. The mobile unit, however, must be compatible with base stations having a single transmit antenna as well as base stations having transmit antenna diversity. A problem arises, therefore, when the mobile communication system is initially powered up or when it passes from one cell to another cell. The mobile unit must not only determine which of several base signals offers a preferable signal strength. It must also determine whether the base station offers transmit antenna diversity. If the mobile unit incorrectly decodes a received signal and assumes no transmit diversity, it loses the improved gain of transmit diversity. Alternatively, if the mobile unit incorrectly decodes a received signal and assumes transmit diversity, multiple fingers of the rake combiner circuit 404 contribute noise to the received signal.

A previous method of blind diversity detection by a mobile unit was presented in U.S. patent application Ser. No. 09/373,855, filed Aug. 13, 1999, and incorporated herein by reference. Therein, a method was disclosed to detect diversity transmission at a base station based on received signal strength. A problem with this method of blind diversity detection arises when a mobile unit must decode pilot symbols from broadcast channels (BCCH) of multiple base stations. This detection may require 250 milliseconds for each base station. Alternatively, if the base station communicates its diversity status to the mobile unit through a third layer (L3) message, this message still requires Viterbi decoding. Thus, previous methods of diversity detection require time and power to detect diversity and thereby optimally select a base station during power-up or during a soft handoff.

SUMMARY OF THE INVENTION

The foregoing problems are resolved by a circuit for detecting a transmit diversity signal, comprising a first circuit (706) arranged to receive a first synchronization code. The first synchronization code is modulated by a data signal. The first circuit produces a first output signal. A second circuit (732) is arranged to receive a plurality of predetermined signals. The second circuit produces a channel estimate. A detection circuit (710, 712) is arranged to receive the first output signal and the channel estimate. The detection circuit produces a signal corresponding to the data signal.

The present invention reduces transmit diversity detection time. Diversity detection is accomplished without Viterbi decoding.

BRIEF DESCRIPTION OF THE DRAWINGS

A more complete understanding of the invention may be gained by reading the subsequent detailed description with reference to the drawings wherein.

DETAILED DESCRIPTION OF THE PREFERRED EMBODIMENTS

A mobile unit must select a base station from several candidate base stations at power-up and during soft handoff within a cell. The selection process is based on received power from each base station as will be explained in detail. There may, however, be as many as 20 candidate base stations to evaluate during the selection process. Moreover, some base stations may utilize STTD for high-density urban areas with primarily pedestrian travel. STTD for such pedestrian travel has low Doppler rates of approximately 5 Hz and typically provides a 3 dB advantage ($\beta$) over non-diversity transmission. Other base stations in lower density areas may primarily communicate with vehicular mobile units. For the higher Doppler rates of vehicular travel, STTD typically provides a 0.7 dB ($\beta$) advantage over non-diversity transmission. These other base stations, therefore, may utilize non-diversity transmission in such low-density areas. Thus, the mobile unit must select a base station from a candidate list that may include base stations that use STTD as well as no diversity.

Figure 7:
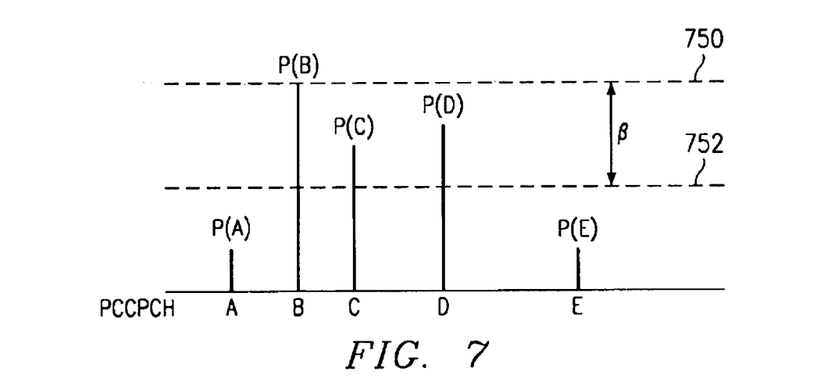
FIG. 7 is a diagram showing received power from base stations A–E.

Referring now to FIG. 7, there is a diagram showing received power P(A)–P(E) at a mobile unit corresponding to exemplary base stations A–E. The maximum received power P(B) from base station B is indicated by dashed line 750. A power level indicated by dashed line 752 indicates a power level that is $\beta$ less than the maximum received power 750, where $\beta$ is the power advantage afforded by STTD over non-diversity transmission. The particular value of $\beta$ depends on the Doppler rate as previously discussed and typically has a value from 0.7 dB to 3 dB. The mobile unit can determine this Doppler rate from the phase shift of received pilot symbols and thereby determine a proper value for $\beta$ from a lookup table, equation or other appropriate method. A circuit and method for estimating the Doppler frequency is described in detail in copending U.S. patent application Ser. No. 09/224,632, filed Dec. 31,1998, and incorporated herein by reference. This value of β is then used by the mobile to select a subset of base stations from the candidate list of base stations prior to final selection. The subset of base stations includes all base stations having received power bounded by dashed lines 750 and 752. In the example of FIG. 7, therefore, the mobile unit will only consider base stations B–D for final selection and exclude base stations A and E. The mobile unit then determines which of base stations employ STTD diversity as will be explained in detail. Finally, a base station is selected according to the criteria of TABLE II.

TABLE II

| Base Station B | Base Station D | Selection Criteria | Select |
| --- | --- | --- | --- |
| No Diversity | No Diversity | P(B) > P(D) | B |
|  |  | P(D) > P(B) | D |
| Diversity | Diversity | P(B) > P(D) | B |
|  |  | P(D) > P(B) | D |
| No Diversity | Diversity | P(B) > P(D) + β | B |
|  |  | P(D) > P(D) − β | D |
| Diversity | No Diversity | P(B) > P(D) − β | B |
|  |  | P(D) > P(B) + β | D |

Figure 8:
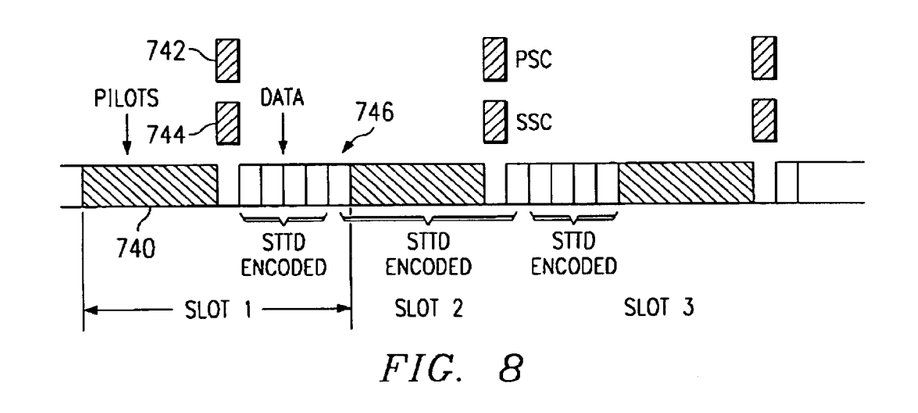
FIG. 8 is a diagram showing a data format of an exemplary time slot.

Referring now to FIG. 8, there is a diagram showing the format of an exemplary time slot transmitted by a base station. This diagram will be used to explain three-stage acquisition of the base station by a mobile unit. Each of time slots 1–3 has the same format, so only time slot 1 will be explained in detail. The time slot includes pilot symbols 740, data symbols 746 and primary (PSC) and secondary (SSC) synchronization channel symbols. The pilot symbols are predetermined symbols that are transmitted with each time slot and are known to the mobile unit. These pilot symbols are used by the mobile unit to determine a channel estimate and a Doppler rate. The data symbols are STTD encoded and preferably quadrature phase shift keyed (QPSK) data. The PSC and SSC symbols are transmitted simultaneously without a long code to facilitate efficient identification of the base station. According to an embodiment of the present invention, a non-diversity base station transmits +1 PSC or SSC symbols. Alternatively, a diversity or STTD base station transmits −1 PSC or SSC symbols. This sign change of the PSC and SSC symbols is compatible with the existing three-stage acquisition process. The PSC symbol is modulated with a short code of preferably length 256 that is the same for each base station. The received power of each PSC symbol is then used to determine the relative power of each base station. Once the PSC symbol is identified, the timing for the SSC symbol is also known, since both are transmitted simultaneously. The SSC symbol is modulated with one of 16 possible orthogonal codes, each orthogonal code corresponding to a respective set of 32 long codes. The mobile unit searches the 16 orthogonal codes to match the SSC symbol. This match is preferably performed by a match filter as is well known to those of ordinary skill in the art. When the match is completed, the mobile unit proceeds to the third stage of acquisition. This third stage requires the mobile unit to identify one group of 32 possible long codes that modulate the data symbols and determine which of 16 time slots in a frame has been matched. The mobile unit, therefore, must search 512 possible combinations in order to match the long code and decode the data symbols.

Figure 9:
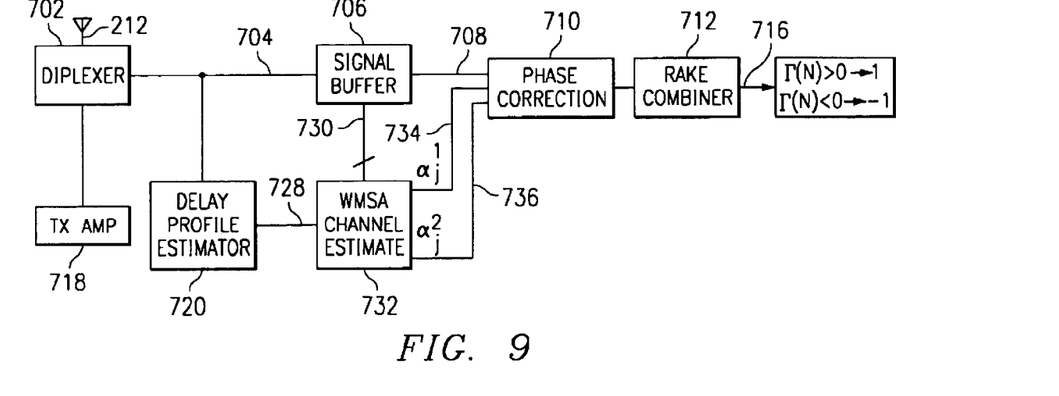
FIG. 9 is a block diagram of a diversity detection circuit of the present invention.

Referring now to FIG. 9, there is a mobile unit of the present invention configured for transmit diversity detection. Mobile antenna 212 receives multipath signals transmitted by base station antennas at leads 180 and 182 (FIG. 1), respectively. A received signal for an SSC symbol, for example, has the form of equation [15], where $\gamma_1=+1$ when there is no diversity and $\gamma_1=-1$ when the base station transmits with a diversity antenna. Here a represents respective phase rotation of the received signal, $C_i$ represents one of 16 codes corresponding to one of 16 time slots within the received frame and $n_i$ represents additive white Gaussian noise (AWGN). In the absence of transmit diversity, for example, channel estimate $\alpha_j^1$ derotates the received signal and $\alpha_j^1$ is zero. Alternatively, when transmit diversity is present and the PSC or SSC are transmitted from alternating antennas, then the respective one of $\alpha_j^1$ and $\alpha_j^2$ derotates the received signal.

$$r_i = \alpha \gamma_i C_i + n_i \qquad [15]$$

Diplexer circuit 702 couples these received multipath signals $r_i$ to lead 704 during receive mode operation. Delay profile estimator circuit 720 also receives the multipath signals on lead 704. Delay profile estimator circuit 720 includes a despreader circuit as in FIG. 6 and a match filter circuit (not shown). The delay profile estimator circuit 720 determines which of the received multipath signals should be combined based on the strength of the match filter output. The delay profile estimator circuit applies a control signal corresponding to the Doppler rate of the received signal to the WMSA channel estimate circuit 732 via lead 728. This control signal determines the variable K number of time slots used by the WMSA channel estimate circuit 732 (FIG. 5). The WMSA channel estimate circuit produces channel estimate signals $\alpha_j^1$ and $\alpha_j^2$ at leads 734 and 736, respectively. Phase correction circuit 710 receives these channel estimate signals together with the SSC symbols on lead 708 and produces phase-corrected SSC symbols at rake combiner circuit 710 as in equation [16], where the asterisk represents a complex conjugate operation.

$$\alpha^* r_i = \alpha^*(\alpha \gamma_i C_i + n_i) \qquad [16]$$

Equation [16] is further simplified at equation [17]. The code $C_i$ is known from second stage acquisition and readily removed by the mobile unit leaving SSC symbol $\gamma_i$ and a noise term.

$$\alpha^* r_i = |\alpha|^2 \gamma_i C_i + \alpha^* n_i \qquad [17]$$

The rake combiner circuit 712 combines and accumulates multi-path data signals from the phase correction circuit 710 over preferably N=64 time slots. For the worst case of slow fading corresponding to a Doppler rate of 5 Hz, the fading parameter a remains relatively constant, since the corresponding fade duration of 200 milliseconds is equivalent to approximately 3200 time slots. Moreover, each SSC symbol has a constant value γ corresponding to either +1 or −1 depending on the respective absence or presence of transmit diversity. The rake combiner circuit produces the resulting signal of equation [18] at lead 716.

$$\Gamma(N) = N\gamma|\alpha|^2 + \sum_{i=1}^{N} \alpha^* n_i \qquad [17]$$

Figure 10:
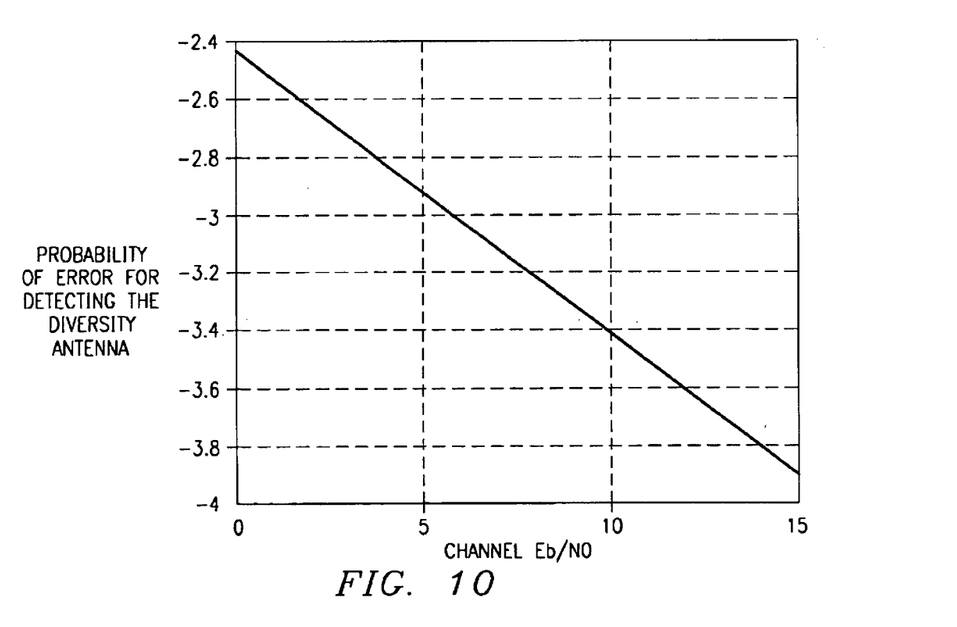
FIG. 10 is a simulation showing the probability of erroneous diversity detection of the present invention.

If the accumulated value at lead 716 is greater than zero, the base station does not use transmit diversity. Alternatively, if the base station does use transmit diversity, the value on lead 716 will be less than zero. For the exemplary value of N=64 time slots corresponding to four data frames, therefore, the mobile unit can readily detect the presence or absence of transmit diversity at each candidate base station in 40 milliseconds. Under these conditions, the probability of incorrectly detecting transmit diversity at a base station as a function of the bit energy to noise ratio (Eb/N0) is given at FIG. 10. For a ratio of 5, for example, the probability erroneous diversity detection is approximately $10^{-3}$. This method of diversity detection is highly advantageous in providing reliable transmit diversity detection without Viterbi decoding the received signal. Detection time is greatly reduced over that required by L3 message decoding.

Although the invention has been described in detail with reference to its preferred embodiment, it is to be understood that this description is by way of example only and is not to be construed in a limiting sense. For example, advantages of the present invention may be achieved by a digital signal processing circuit as will be appreciated by those of ordinary skill in the art having access to the instant specification. Moreover, although a preferred embodiment of the present invention teaches diversity information transmission through PSC or SSC symbols, other information such as base station transmit power or system frame number may also be included. Furthermore, these PSC or SSC symbols may also be encoded as QPSK symbols rather than BPSK, thereby doubling the information content of each symbol.

Figure 11A:
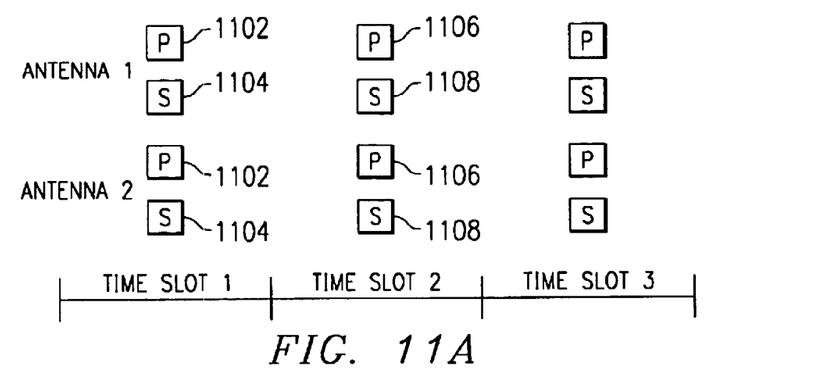
FIG. 11A is a format of PSC and SSC transmission of the present invention; present invention.
Figure 11B:
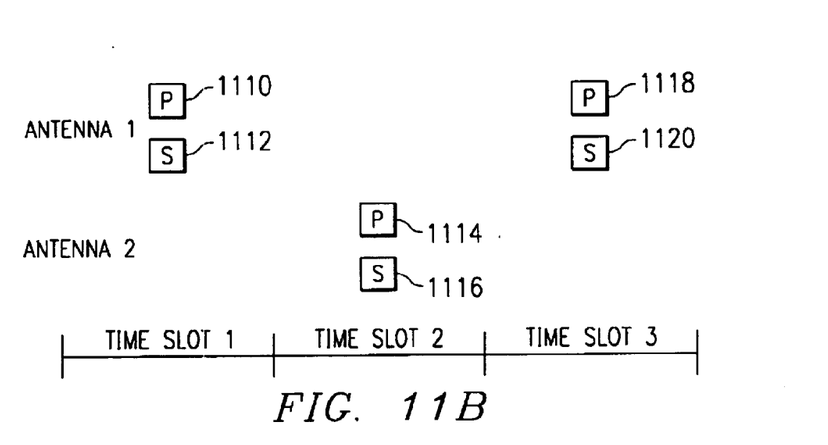
FIG. 11B is another format of PSC and SSC transmission of the present invention.
Figure 11C:
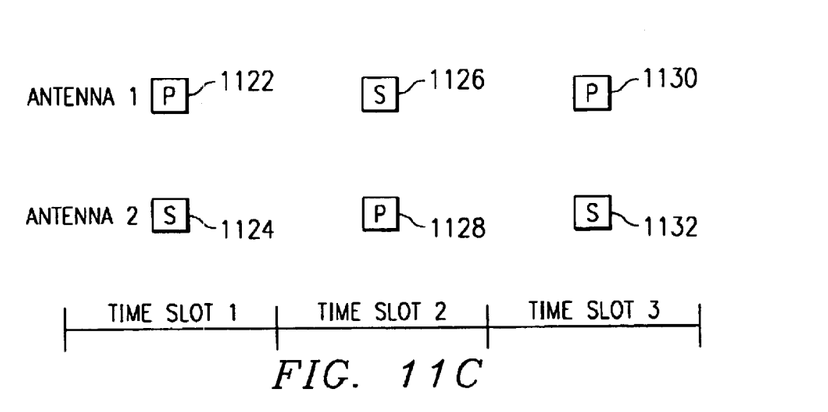
FIG. 11C is yet another format of PSC and SSC transmission of the present invention.

Referring to FIG. 11A through FIG. 11C, these PSC and SSC symbols may be transmitted by different diversity formats. The embodiment of FIG. 11A of the present invention illustrates simultaneous transmission of the PSC 1102 and SSC 1104 from respective antennas 1 and 2 during time slot 1. This transmission pattern is repeated for PSC 1106 and SSC 1108 from respective antennas 1 and 2 during time slot 2. The diagram of FIG. 11B illustrates another embodiment of the present invention, wherein the PSC 1110 and SSC 1112 are transmitted from antenna 1 during time slot 1. The PSC 1114 and SSC 1116 are then transmitted from antenna 2 during time slot 2. The pattern is repeated by transmitting PSC 1118 and SSC 1120 from antenna 1 during time slot 3. The diagram of FIG. 11C illustrates yet another embodiment of the present invention, wherein the PSC 1122 is transmitted from antenna 1 and the SSC 1124 is transmitted from antenna 2 during time slot 1. Next, during next time slot 2, the SSC 1126 is transmitted from antenna 1 and the PSC 1128 is transmitted from antenna 2. This pattern is repeated by transmitting PSC 1130 from antenna 1 and SSC 1132 from antenna 2 during time slot 3. Each of these patterns is advantageous in providing transmit diversity for PSC and SSC symbols. Moreover, when only one of the PSC and SSC is modulated with a diversity signal, the other of the PSC and SSC is a known symbol and, therefore, may be used to determine a channel estimate. This channel estimate may be calculated by using the PSC or SSC together with the pilot symbols or in lieu of the pilot symbols.

It is understood that the inventive concept of the present invention may be embodied in a mobile communication system as well as circuits within the mobile communication system. It is to be further understood that numerous changes in the details of the embodiments of the invention will be apparent to persons of ordinary skill in the art having reference to this description. It is contemplated that such changes and additional embodiments are within the spirit and true scope of the invention as claimed below.

What is claimed:

1. A circuit for detecting a signal, comprising:
   a first circuit arranged to receive a first synchronization code, the first synchronization code modulated by a data signal, the first synchronization circuit producing a first output signal;
   a second circuit arranged to receive a plurality of predetermined signals, the second circuit producing a channel estimate; and
   a detection circuit arranged to receive the first output signal and the channel estimate, the detection circuit producing a signal corresponding to the data signal.

2. A circuit as claim 1, further comprising a third circuit arranged to receive a second synchronization code modulated by the data signal, the second synchronization circuit producing a second output signal.

3. A circuit as claim 2, wherein the detection circuit is arranged to receive the second output signal.

4. A circuit as claim 1, wherein the data signal corresponds to transmit diversity of a base station.

5. A circuit as in claim 4, wherein the transmit diversity corresponds to transmission from a plurality of antennas.

6. A circuit as claim 1, wherein the first synchronization code is binary phase shift keyed (BPSK).

7. A circuit as in claim 1, wherein the first synchronization code is quadrature phase shift keyed (QPSK).

8. A circuit as claim 1, wherein the first synchronization code is received from a first base station and wherein the data signal corresponds to information about at least another base station.

9. A circuit as claim 1, wherein the first synchronization code is received from a base station and wherein the data signal corresponds to the base station transmit power.

10. A circuit as claim 1, wherein the first synchronization code is received from a base station and wherein the data signal corresponds to the base station system frame number.

11. A circuit as claim 1, wherein the data signal corresponds to a time offset of the secondary common control channel (SCCPCH) from a primary common control channel (PCCPCH).

12. A circuit as claim 1, wherein the data signal corresponds to broadcast information to a plurality of mobile receivers.

13. A circuit as claim 1, wherein the first synchronization code is transmitted from at least a first base station and a second base station in a same network.

14. A circuit as claim 1, wherein the first synchronization code is received from a first base station and wherein the first synchronization code is different from a corresponding first synchronization code of at least another base station in a same network.

15. A method of detecting a data signal comprising the steps of:
    receiving a synchronization code modulated with the data signal;
    receiving a sequence of symbols modulated by a code;
    matching the code;
    producing a channel estimate; and
    detecting the data signal in response to the channel estimate.

16. A method as claim 15, wherein the data signal corresponds to transmit diversity of a base station.

17. A method as in claim 16, wherein the transmit diversity corresponds to transmission from a plurality of antennas.

18. A method as claim 15, wherein the synchronization code is received from a base station and wherein the data signal corresponds to information about at least another base station.

19. A method as in claim 18, wherein the information about at least another base station comprises a long code of said at least another base station.

20. A method as in claim 18, wherein the information about at least another base station comprises a code group of said at least another base station.

21. A method as claim 15, wherein the synchronization code is received from a base station and wherein the data signal corresponds to the base station transmit power.

22. A method as claim 15, wherein the synchronization code is received from a base station and wherein the data signal corresponds to the base station system frame number.

23. A method as claim 15, wherein the data signal corresponds to a time offset of the secondary common control channel (SCCPCH) from a primary common control channel (PCCPCH).

24. A method as claim 15, wherein the data signal corresponds to broadcast information to a plurality of mobile receivers.

25. A method as claim 15, wherein the synchronization code is transmitted from at least a first base station and a second base station in a same network.

26. A method as claim 15, wherein the synchronization code is received from a first base station and wherein the synchronization code is different from a corresponding synchronization code of at least another base station in a same network.

27. A method of transmitting a data signal comprising the steps of:

producing a synchronization code;

modulating the synchronization code with a data signal, thereby producing a modulated synchronization code; and transmitting the modulated synchronization code.

28. A method as claim 27, wherein the data signal corresponds to transmit diversity of a base station.

29. A method as in claim 28, wherein the transmit diversity corresponds to transmission from a plurality of antennas.

30. A method as claim 27, wherein the synchronization code corresponds to a base station that performs the step of transmitting.

31. A method as in claim 30, wherein the data signal corresponds to information about at least another base station.

32. A method as in claim 31, wherein the information about at least another base station comprises a long code of said at least another base station.

33. A method as in claim 31, wherein the information about at least another base station comprises a code group of said at least another base station.

34. A method as claim 30, wherein the data signal corresponds to the base station transmit power.

35. A method as claim 30, wherein the data signal corresponds to the base station system frame number.

36. A method as claim 30, wherein the data signal corresponds to a time offset of the secondary common control channel (SCCPCH) from a primary common control channel (PCCPCH).

37. A method as claim 30, wherein the data signal corresponds to broadcast information to a plurality of mobile receivers.

38. A method as claim 27, further comprising the step of producing the synchronization code at another base station in a same network.

39. A method as claim 27, further comprising the step of producing another synchronization code at another base station in a same network that is different from the synchronization code.

40. A method of transmitting a signal from a base station comprising the steps of:

transmitting a first synchronization code from a first antenna at a first time; and transmitting a second synchronization code from the first antenna at the first time, wherein at least one of the first and second synchronization codes is modulated by a data signal.

41. A method as in claim 40, further comprising the steps of:

transmitting the first synchronization code from a second antenna at the first time; and transmitting the second synchronization code from the second antenna at the first time.

42. A method as claim 40, further comprising the step of transmitting the first synchronization code at another base station in a same network.

43. A method as claim 42, wherein the second synchronization code is different from a second synchronization code at said another base station.

44. A method as in claim 40, further comprising the steps of:

not transmitting the first synchronization code from the first antenna at a second time different from the first time;

not transmitting the second synchronization code from the first antenna at the second time;

transmitting the first synchronization code from a second antenna at a second time; and transmitting the second synchronization code from the second antenna at the second time.

45. A method of transmitting a signal from a base station comprising the steps of:

transmitting a first synchronization code from a first antenna of the base station at a first time;

not transmitting a second synchronization code from a second antenna of the base station at the first time;

not transmitting the first synchronization code from the first antenna of the base station at a second time different from the first time;

transmitting a second synchronization code from the second antenna of the base station at the second time; and wherein at least one of the first and second synchronization codes is modulated by a data signal.

46. A method as claim 45, further comprising the step of transmitting the first synchronization code at another base station in a same network.

47. A method as claim 45, wherein the second synchronization code is different from a second synchronization code at another base station in a same network.

48. A method of receiving a signal from a base station comprising the steps of:

receiving a first synchronization code from a first antenna at a first time; and receiving a second synchronization code from the first antenna at the first time, wherein at least one of the first and second synchronization codes is modulated by a data signal.

49. A method as in claim 48, further comprising the steps of:

receiving the first synchronization code from a second antenna at the first time; and receiving a second synchronization code from the second antenna at the first time.

50. A method as claim 48, further comprising the step of receiving the first synchronization code from a plurality of base stations in a same network.

51. A method as claim 48, wherein the second synchronization code is different from a second synchronization code of another base station in a same network.

52. A method as in claims 48, further comprising the steps of:

not receiving the first synchronization code from the first antenna at a second time different from the first time;

not receiving the second synchronization code from the first antenna at the second time;

receiving the first synchronization code from a second antenna at a second time; and receiving the second synchronization code from the second antenna at the second time.

53. A method of receiving a signal from a base station comprising the steps of:

receiving a first synchronization code from a first antenna at a first time;

not receiving a second synchronization code from a second antenna at the first time;

not receiving the first synchronization code from the first antenna at a second time different from the first time;

receiving a second synchronization code from the second antenna at the second time; and wherein at least one of the first and second synchronization codes is modulated by a data signal.

54. A method as claim 53, further comprising the step of receiving the first synchronization code from another base station in a same network.

55. A method as claims 53, wherein the second synchronization code is different from a second synchronization code at another base station in a same network.

* * * * *